United States Patent
Schindler et al.

(10) Patent No.: US 7,258,897 B1
(45) Date of Patent: Aug. 21, 2007

(54) PROCESS FOR PRODUCING AN ORNAMENTAL SURFACE ON A SUBSTRATE

(76) Inventors: Anthony J. Schindler, P.O. Box 1530, Cave Creek, AZ (US) 85307; Philip M. Schindler, P.O. Box 7381, Cave Creek, AZ (US) 85327; Jeffery Worm, 20635 N. Cave Creek Rd., Phoenix, AZ (US) 85024

( * ) Notice: Subject to any disclaimer, the term of this patent is extended or adjusted under 35 U.S.C. 154(b) by 0 days.

(21) Appl. No.: 11/368,831

(22) Filed: Mar. 6, 2006

Related U.S. Application Data

(60) Provisional application No. 60/659,999, filed on Mar. 7, 2005.

(51) Int. Cl.
*B05D 1/32* (2006.01)

(52) U.S. Cl. ........................ 427/272; 427/286

(58) Field of Classification Search ................ 427/271, 427/272, 274, 277, 278, 280, 282, 286, 287, 427/300, 337, 343, 344, 355
See application file for complete search history.

(56) References Cited

U.S. PATENT DOCUMENTS

| | | | |
|---|---|---|---|
| 651,657 A | 6/1900 | Eshe | |
| 1,747,249 A | 2/1930 | Korompay | |
| 3,701,681 A * | 10/1972 | Murphy et al. | 427/245 |
| 3,712,825 A | 1/1973 | Yocum | |
| 3,737,511 A | 6/1973 | Dillon | |
| 3,789,759 A | 2/1974 | Jones | |
| 3,819,395 A * | 6/1974 | Yocum | 427/264 |
| 3,853,577 A * | 12/1974 | Nishida et al. | 427/270 |
| 4,043,826 A * | 8/1977 | Hum | 523/218 |
| 4,105,816 A | 8/1978 | Hori | |
| 4,293,599 A | 10/1981 | Hori et al. | |
| 4,310,370 A | 1/1982 | Arai et al. | |
| 4,668,451 A | 5/1987 | Langson | |
| 4,844,964 A | 7/1989 | Jurrus | |
| 5,069,939 A | 12/1991 | McKinnon | |
| 5,167,991 A * | 12/1992 | Lowe | 427/267 |
| 5,243,905 A * | 9/1993 | Webber | 101/128 |
| 5,328,730 A | 7/1994 | Lowe | |
| 5,637,236 A * | 6/1997 | Lowe | 216/39 |

(Continued)

FOREIGN PATENT DOCUMENTS

JP 05162111 6/1993

(Continued)

OTHER PUBLICATIONS

Paladi-Kovacs, A., "Decorative Concrete Surface Design," Periodica Polytechnica Ser. Civ. Eng. vol. 47, No. 1, pp. 57-61 (2003).*

*Primary Examiner*—William Phillip Fletcher, III
(74) *Attorney, Agent, or Firm*—Gregory J. Nelson

(57) ABSTRACT

A process for treating a substrate such as glass or wood to provide the appearance of concrete. One or more coats of a polymeric cementitious material is thinly spread over the substrate. Colorants may be added or the coating may be stained subsequent to drying. Designs may be impressed or applied to the coating. The completed article may be used for decorative and architectural items such as table tops. In one embodiment a design is marked off with tape prior to applying the cementitious material.

12 Claims, 3 Drawing Sheets

CUT SUBSTRATE TO SIZE

PREPARE SURFACE

MIX POLYMER CEMENT

APPLY CEMENT TO SUBSTRATE BY TROWEL, BRUSH OR SPRAY

ADD COLORANT (OPTIONAL)

APPLY SURFACE DECORATION (OPTIONAL)

ALLOWING THE COATING TO DRY

APPLY COLORANT TO SURFACE (OPTIONAL)

ALLOWING COATING TO DRY

APPLY COLORANT TO SURFACE (OPTIONAL)

APPLY SEAL COAT (WAX, EPOXY OR URETHANE)

U.S. PATENT DOCUMENTS

| | | | |
|---|---|---|---|
| 5,735,094 A | 4/1998 | Zember | |
| 5,766,728 A | 6/1998 | Iwaya | |
| 5,803,964 A | 9/1998 | Scarborough | |
| 5,833,907 A | 11/1998 | Uchida et al. | |
| 6,413,618 B1 * | 7/2002 | Parker et al. | 428/195.1 |
| 6,610,224 B2 | 8/2003 | Sullivan | |

FOREIGN PATENT DOCUMENTS

| | | |
|---|---|---|
| JP | 07108512 | 4/1995 |
| JP | 08135128 | 5/1996 |
| JP | 08175883 | 7/1996 |
| WO | WO86/03433 A1 * | 6/1986 |

* cited by examiner

CUT SUBSTRATE TO SIZE

PREPARE SURFACE

MIX POLYMER CEMENT

APPLY CEMENT TO SUBSTRATE BY TROWEL, BRUSH OR SPRAY

ADD COLORANT (OPTIONAL)

APPLY SURFACE DECORATION (OPTIONAL)

ALLOWING THE COATING TO DRY

APPLY COLORANT TO SURFACE (OPTIONAL)

ALLOWING COATING TO DRY

APPLY COLORANT TO SURFACE (OPTIONAL)

APPLY SEAL COAT (WAX, EPOXY OR URETHANE)

FIGURE 1

PROCESS FOR PRODUCING AN ORNAMENTAL SURFACE ON A SUBSTRATE

CROSS REFERENCE TO RELATED APPLICATION

This application is based on U.S. Provisional Patent Application Ser. No. 60/659,999, filed Mar. 7, 2005, of the same title.

FIELD OF THE INVENTION

The present invention relates to decorative items and more particularly relates to the application of a cementitious coating to a substrate such as glass, wood or plastic which coating may be treated to provide various decorative effects having the appearance of concrete.

BACKGROUND OF THE INVENTION

It is sometimes desirable to create various decorative effects on substrates both old or new to achieve a desired appearance. Use of cementitious materials is known and these materials have been applied to various surfaces and subsequently treated in various ways to achieve the appearance of brick, marble and stone replicating the appearance of these materials.

For example, U.S. Pat. No. 5,328,730 relates to a replicated stone surface and method for producing the replicated stone surface with coloration and texture replicating natural stone. The replicated stone surface comprises a layer of polymer material adhered to a substrate such as a concrete slab or wall including a plurality of simulated stones and simulated grout lines sealed with an acrylic polymer sealer to protect the replicated stone.

U.S. Pat. No. 5,069,939 relates to the preparation of a simulated marble surface which comprises mixing cement and sand to form a first mixture which is added to an aqueous solution of an adhesive resin such as an acrylic resin to create a first liquid mortar. Cement and sand are mixed to form a second mixture to which is added a resin. The first and second liquid mortar are applied to create a specified effect.

While various processes, as described above, are described in the prior art, they generally relate to replicating a surface such as stone or brick and are limited to particular aesthetics such as having a stone or mottled appearance.

BRIEF SUMMARY OF THE INVENTION

The present invention is a process for applying a cementitious coating over a new or existing substrate such as glass, wood or plastic, which result in a surface which is wear-resistant and which may be colored, etched and treated in various ways to achieve a variety of desired decorative and aesthetic effects having the appearance of concrete, stone and even marble.

The process allows the user to achieve a wide variety of effects, textures and colors consistent with the preferences of the individual. In accordance with the present invention, a polymer cement is first prepared. This polymer cement is prepared by mixing a suitable polymer with cement and sand. A substrate is selected such as a piece of glass cut to the desired size. One or more thin coatings of polymer cement is applied to the surface of the glass by suitable technique such as troweling, spraying or pouring. The thin coating of polymer cement is then allowed to dry. During the drying process, while the coating is still viscous, a suitable surface decoration may be imparted by a technique such as etching, embossing or the like. The decorative pattern may also be imparted by applying an overlay or a mask to or beneath the thin coating of polymeric cement to define the decorative design in to the layer.

The decorative mask or overlay, which defines the desired pattern, is removed and the cementitious layer is allowed to dry. After the surface has dried thoroughly, it may colored using a suitable concrete stain such as an acid base or acrylic base concrete stain.

BRIEF DESCRIPTION OF THE DRAWINGS

The invention will be more fully understood from the following detailed description and claims taken in conjunction with the accompanying drawings in which:

FIG. 1 is a schematic illustrating the process of the present invention;

DETAILED DESCRIPTION OF THE DRAWINGS

Figure 2:
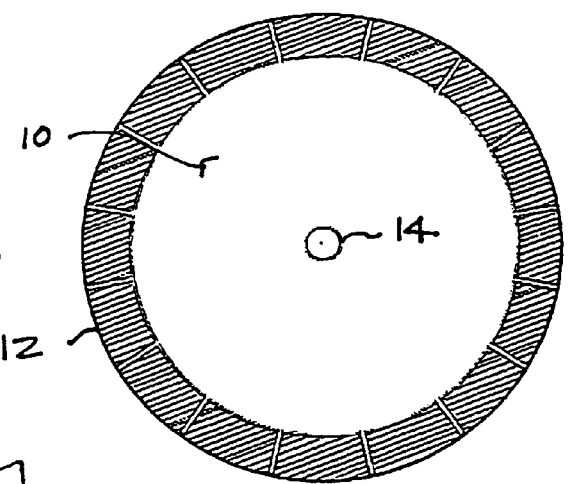
FIG. 2 is a plan view of a competed table top according to the present invention.

The present invention relates to the application of a decorative surface to a substrate. The substrate may be wood, plastic or is preferably glass. The present invention has particular application to applying such decorative surfaces to tempered glass to enhance its appearance when used architecturally or for such applications as table tops both for interior and patio use.

As set forth FIG. 1, the initial step is to cut the substrate to size and prepare the substrate by cleaning and smoothing the surface and then removing any surface of grease and oils. Next, a cementitious polymer cement is prepared. The polymer cement is prepared by mixing a suitable polymer with water, portland cement and sand. Generally, the recommended proportions are one part polymer, one part water, two parts cement and a filler consisting of two parts 90 grit sand or finer. The resulting mixture will have a smooth, flowable consistency. Various additives can be used. A wide variety of synthetic resins may be used to produce polymer cement. The synthetic resin binders generally available are based on monomers or pre-polymers, such as methacrylate. Acrylic resins are formed by the free-radical polymerization of acrylate methacrylate monomers. Thus, acrylic resins are any of numerous groups of thermoplastic or thermosetting polymers or co-polymers. Other resins that may be used are polyesters and epoxies. The resulting mixture of the polymer, cement, water and a filler such as sand is known as synthetic resin concrete, plastic resin concrete or simply polymer cement.

The flowable polymer cement mixture is evenly applied to the substrate such as a sheet of glass. The application may be by troweling, spraying and pouring or sponging over the surface of the glass. Preferably the application is a relatively thin coat ranging from approximately 1 to 3 mils thick. At this point, the applied thin coat may be simply allowed to air dry leaving a resulting appearance effect of natural concrete. A second thin coating may be applied over the first coating once the first coating is dry. The coated glass sheet may be used for various purposes such as table tops providing the appearance of natural concrete. The advantage is a decorative appearance of relative light weight which is less expensive than a concrete slab. Drying may be accelerated by drying in an oven or heated environment although because of the thin coating, air drying generally is preferred.

If the user wishes to include additional decorative effects, a suitable coloring agent may be applied to the polymer cement while still wet. The resulting effect then is a surface resembling colored or stained concrete. Various liquid, powder and granular pigment containing materials for cement are available from manufacturers such as Davis Colors.

Other decorative effects may also be applied to the wet coat by embossing etching or using an overlay, mask or stencil having the desired shape to impress design in the coating while still wet. For example, images of plants and flowers can be impressed into the surface by a mask which is pressed against the wet surface. After the surface with the design has thoroughly dried, a suitable colorant such as a chemical stain can be applied to selected portions of the design to create the effect. After the stain has dried, a suitable sealant or protectant such as a concrete wax or sealer can be used. Chemical stains for concrete generally contain an acid and metallic salts or may be water-based concrete stains. Dyes and tints may also be used but are generally less intensive in color and give a more translucent effect.

A thin coating of the polymeric cement is applied to a table top of glass and an overlay having the design pressed into the wet coating. The overlay or mask is removed leaving the desired appearance effect in the surface which, after drying, may be suitably colored. A seal coat such as wax, clear urethane, epoxy or a water-based sealer may be applied for protection and durability.

It is also possible to achieve a marbleized or stone effect by using several different stains and wiping the wet surface to create the desired appearance. The technique is similar to faux finishing and texture may be imparted by using tools, course cloth, sponges, brushing and crumpled paper.

EXAMPLE I

A sheet of tempered glass was first cut to the desired shape, in this case round, to conform to a top for a table base and was the substrate. A polymer sold under the name Relay and available from the Synac Corporation of San, Diego, Calif., was mixed with water, cement and sand in the recommended proportions of one part Relay polymer, one part water and two parts Portland cement. The Portland cement may be type 1, 2 or 3 cement and mixing should occur at temperatures above 50° F. The components were mixed thoroughly and the resulting mixture was flowable. The flowable mixture was applied by troweling to the surface of glass to a thickness of approximately 2 mils. The decorative surface was allowed to air dry until thoroughly dry, which required about 24 hours. A concrete acid-based stain such as that sold under the label Kemiko was used to color the surface and was applied by brushing. The stain was allowed to dry and a concrete wax of the type available under the brand name Kemiko was applied by hand over the surface to protect it. The resulting article had the appearance of stained concrete and it was not apparent the substrate was glass. The stained, decorative surface on the substrate provided an attractive, wear-resistant, durable finish suitable for use on furniture, such as a table top, at less costs and less weight than a concrete slab.

EXAMPLE 2

Again, the polymer sold under the trademark Relay available from the Synac Corporation was mixed with water, Portland cement and 90 grit sand in proportions approximately 1 part polymer, 1 part water, 2 parts Portland cement and 2 parts 90 grit sand. A suitable coloring agent such as a concrete coloring agent available under the name Kemiko was included in the mixture. The substrate was a section of tempered glass that had been first cut to the desired shape. The polymer cement and coloring agent were thoroughly mixed to a flowable, spreadable viscosity. The mixture was applied by hand troweling a first coat over a surface of the glass in a thin, smooth coating approximately 2 mils thick. Once the first coat was dry, a second coating of polymer cement was applied having a thickness of about 1-3; mils. A mask consisting of a circular ring with radial spokes was impressed into the second coating while the coating was still wet. The mask was removed, leaving the design impressed in the wet coating. The coating was allowed to dry and, once dry, sections of the decorative coating were colored with acid-based concrete stain to create a multi-colored design. The stain was allowed to dry and a suitable sealer such as Kemiko or Epmar acrylic sealer was applied to the surface to protect it. Acid-based stains generally must be flushed from the surface after application while water-based stains do not require flushing. A water-based stain such as that sold by Pro-Line Universal may also be used. The resulting article was used as a top on indoor and outdoor furniture.

EXAMPLE 3

Referring to FIG. 2, a completed item fabricated in accordance with the present invention is shown. The item is a table top 10 utilizing a round glass substrate 12. The top 10 is sized to fit a table base and typically is 36" to 48" in diameter having a center hole 14 for insertion of an umbrella pole.

Figure 2A:
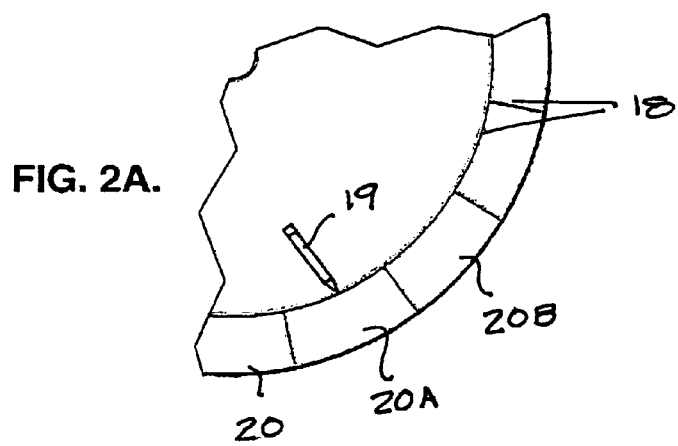
FIGS. 2A to 2G illustrate the steps in fabrication of the table top of FIG. 2.

The initial step shown in FIG. 2A is to mark off the desired design using a marking instrument 19. The design is carefully marked by lines 18 and is a border having the appearance of abutting bricks 20, 20A, 20B, etc. Any desired design may be applied.

Figure 2B:
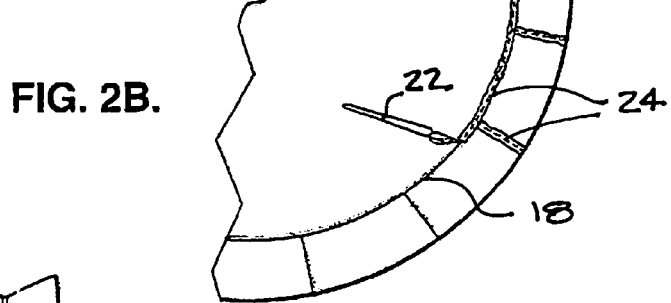
Figure 2C:
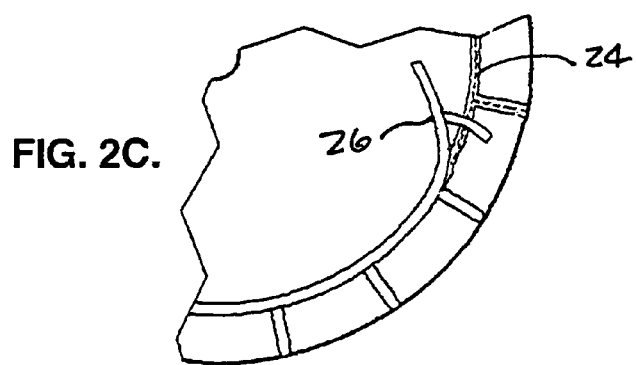

In FIG. 2B, a colored stain is applied by brush or other applicator 22 over the lines forming an outline 24 having a width of about ¼" to ½". The stain outlines may be applied by brush or pencil and the color selected will appear as grout lines when the top is finished. When the stain outlines dry, masking tape 26 is carefully applied over the outline 24. The tape may be various widths but a width of about ⅛" to ¼" works well.

Figure 2D:
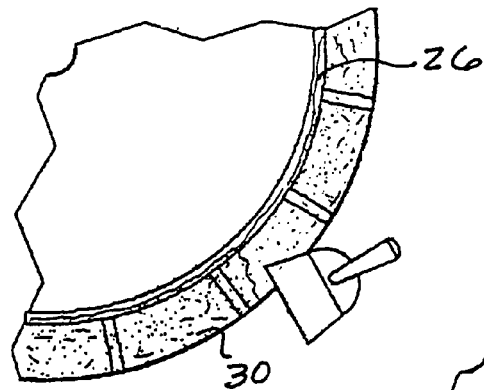

One or more thin coats 30 of polymer cement prepared as described above are applied over the entire surface, as seen in FIG. 2D. Two thin coats each being 2-6 mils in thickness are preferred and are sufficiently translucent so tape 26 remains visible beneath the coats. The cement may be applied by conventional methods such as troweling and the first coat is allowed to dry before the second coat is applied. Drying may be by air drying or drying machines may be used, depending on environmental conditions.

Figure 2E:
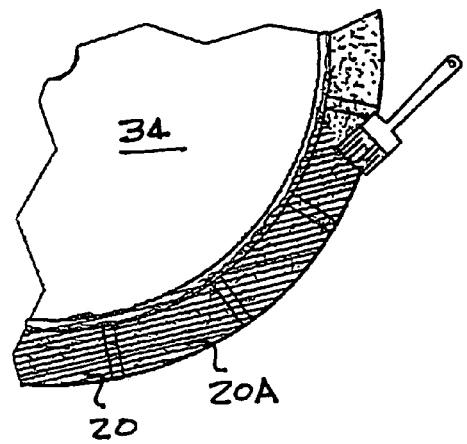

The design is then colored using an acid or water-based stain. In this case, the brick designs 20, 20A, etc., forming the peripheral edge of the top are stained and the center area 34 may also be stained a selected color. This is shown in FIG. 2E.

Figure 2F:
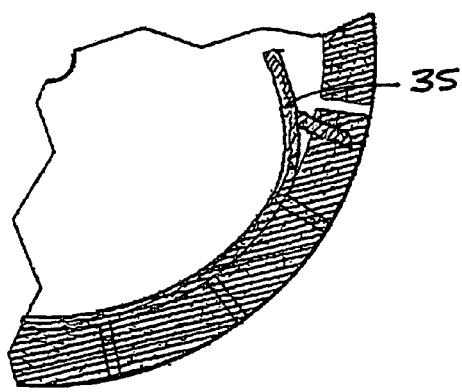
Figure 2G:
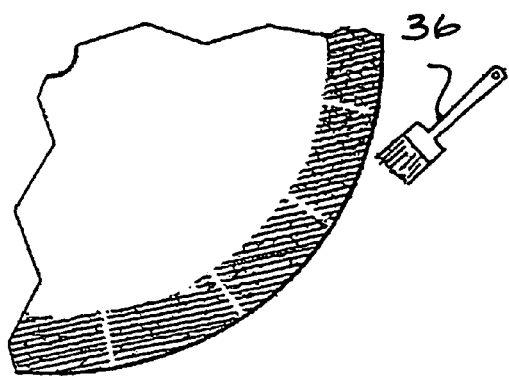

Once the stain is dry, the adhesive tape 26 is peeled away exposing clean grout lines 35 between the bricks as seen in FIG. 2F. The top 10 is completed by application of a sealer such as a water-based concrete sealer over the entire surface as seen in FIG. 2G. The sealer may be applied by a brush 36 or by spraying or other application method.

Thus, it will be seen from the foregoing that an ordinary, smooth substrate such as glass or wood may be treated to give it the appearance of a concrete surface and also to substantially increase the wearability and durability of the surface. The resulting surface can be colored or decorated in accordance with the preferences of the user. The substrate can be easily cut to the desired shape prior to surface application. The use of a substrate, such as glass, results in an attractive, decorative item at a reasonable cost. A glass substrate, when decorated in accordance with the present invention, results in a product that is only a few mils thicker than the untreated substrate. Thus the completed decorative item can be installed in items such as table top frames without the necessity of modifications.

One significant advantage of the process of the present invention is it can be applied not only to new surfaces but also to existing surfaces. Thus, individuals, as for example, having a tempered glass surface on a table, such as a patio table, can by application of the present process completely change the appearance surface. Various designs can be made available to those after-market customers who wish to achieve a new and fresh appearance or look for existing surfaces.

It will be obvious to those skilled in the art to make various changes, alterations and modifications to the invention described herein. To the extent such changes, alterations and modifications do not depart from the spirit and scope of the appended claims, they are intended to be encompassed therein.

We claim:

1. A process for applying a decorative surface to a substrate comprising:
   (a) providing a substrate;
   (b) placing markings on the surface of the substrate to form a design;
   (c) applying a colorant over the markings;
   (d) applying a removable tape over the colorant to mark off the design;
   (e) preparing a polymer cement;
   (f) applying a first thin coat of polymer cement over the substrate and tape and allowing the first coat to dry;
   (g) applying a colorant to selected areas of the design; and
   (h) removing the tape.

2. The process of claim 1 wherein a sealer is applied over the polymer cement.

3. The process of claim 1 wherein the coats of cement are air dried.

4. The process of claim 1 wherein the colorants are water-based stains.

5. The process of claim 1 wherein the substrate is tempered glass.

6. The process of claim 1 wherein a second thin coat of polymer cement is applied over the first.

7. The process of claim 1 wherein the thin coat of polymer cement is approximately between 2-6 mils in thickness.

8. The process of claim 1 for applying a decorative surface wherein the polymer cement contains a resin from the group consisting of epoxies, acrylics and polyesters.

9. The process of claim 1 for applying a decorative surface wherein the polymer cement is prepared having the following approximate proportions:
   1 part polymer, 1 part water, 2 parts cement and 2 parts sand.

10. The process of claim 1 for applying a decorative surface wherein the substrate is glass and is first cut to a desired shape.

11. The process of claim 1 for applying a decorative surface wherein said coating is applied by troweling.

12. The process of claim 1 for applying a decorative surface wherein said coating is applied by brushing.

* * * * *